United States Patent
Minutillo et al.

(10) Patent No.: US 10,261,751 B2
(45) Date of Patent: **\*Apr. 16, 2019**

(54) SYSTEMS, METHODS AND COMPUTER PROGRAM PRODUCTS FOR PERFORMING CALL SWAP

(71) Applicant: IPC Systems, Inc., Jersey City, NJ (US)

(72) Inventors: Stephen J. Minutillo, North Haven, CT (US); Tanveer Ahmad, Stratford, CT (US); Brett R. Berkowitz, New York, NY (US)

(73) Assignee: IPC SYSTEMS, INC., Jersey City, NJ (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/016,795

(22) Filed: Jun. 25, 2018

(65) Prior Publication Data

US 2018/0307459 A1 Oct. 25, 2018

Related U.S. Application Data

(63) Continuation of application No. 15/139,736, filed on Apr. 27, 2016, now Pat. No. 10,031,717.

(Continued)

(51) Int. Cl.
*G06F 3/16* (2006.01)
*G06Q 10/10* (2012.01)
(Continued)

(52) U.S. Cl.
CPC .............. *G06F 3/165* (2013.01); *G06F 3/162* (2013.01); *G06Q 10/10* (2013.01); *H04L 29/06027* (2013.01); *H04L 65/1006* (2013.01); *H04L 65/1053* (2013.01); *H04L 65/1069* (2013.01); *H04M 1/2477* (2013.01); *H04M 1/6025* (2013.01); *H04M 3/569* (2013.01);
(Continued)

(58) Field of Classification Search
CPC ......... G06F 3/162; G06F 3/165; G06Q 10/10; H04L 29/06027; H04L 65/1006; H04L 65/1053; H04L 65/403; H04L 65/1069; H04M 1/2477; H04M 1/6025; H04M 3/569; H04M 3/58; H04M 9/003
USPC ..................................................... 379/212.01
See application file for complete search history.

(56) References Cited

U.S. PATENT DOCUMENTS 4,962,473 A 10/1990 Crain
10,031,717 B2 \* 7/2018 Minutillo ............... G06Q 10/10
(Continued)

FOREIGN PATENT DOCUMENTS

EP 2 175 606 A1 4/2010
WO 2015071492 A1 5/2015

OTHER PUBLICATIONS

Int'l Search Report and Written Opinion for Appln. No. PCT/US2016/029513 dated Jul. 8, 2016.

*Primary Examiner* — Harry S Hong
(74) *Attorney, Agent, or Firm* — Merchant & Gould P.C.

(57) ABSTRACT

Multiple simultaneous calls are controlled. At least one processor is used to display an interface including indicators corresponding to at least two audio presentation devices. Each interface includes call contextual controls which change according to the state of a call. A swap control swaps an active call between the audio presentation devices corresponding to the indicators.

21 Claims, 5 Drawing Sheets

Related U.S. Application Data

(60) Provisional application No. 62/181,629, filed on Jun. 18, 2015.

(51) Int. Cl.
*H04L 29/06* (2006.01)
*H04M 3/56* (2006.01)
*H04M 1/60* (2006.01)
*H04M 1/247* (2006.01)
*H04M 9/00* (2006.01)
*H04M 3/58* (2006.01)

(52) U.S. Cl.
CPC .............. *H04M 3/58* (2013.01); *H04M 9/003* (2013.01); *H04L 65/403* (2013.01)

(56) References Cited

U.S. PATENT DOCUMENTS

| | | |
|---|---|---|
| 2011/0275323 A1 | 11/2011 | Goldman |
| 2013/0114832 A1 | 5/2013 | Lozano |
| 2013/0141514 A1 | 6/2013 | Chao et al. |
| 2013/0303133 A1 | 11/2013 | Sansalone |
| 2016/0373584 A1* | 12/2016 | Minutillo ............... G06Q 10/10 |

\* cited by examiner

SYSTEMS, METHODS AND COMPUTER PROGRAM PRODUCTS FOR PERFORMING CALL SWAP

CROSS-REFERENCE TO RELATED APPLICATION

This application is a continuation of U.S. patent application Ser. No. 15/139,736 filed Apr. 27, 2016, now U.S. Pat. No. 10,031,717, issued Jul. 24, 2018, which claims priority to U.S. Provisional Application No. 62/181,629, filed Jun. 18, 2015, the contents of each of which are incorporated herein by reference.

BACKGROUND OF THE INVENTION

Field of the Invention

Example aspects of the present invention generally relate to a user interface, and more particularly to systems, methods, and computer program products for managing communication information that is of relevance to an end user.

Related Art

In the financial industry, it is common for a group of financial traders to be members of a trading desk that is managed by a head financial trader. As part of their duties, each of the traders often communicates with various parties (e.g., buyers and sellers of financial instruments) by using various means (e.g., voice calls, instant messages, e-mails). In some cases, the traders communicate with multiple parties at a time, discussing trades, market information, and/or other relevant information.

Thus, for the head trader to effectively manage the trading desk, the head trader is required to quickly analyze various types of information, such as trader communications, market information, and other relevant information, as well as the relationships between these types of information. With the vast volume of trades taking place in today's financial markets, and the limitless trader communications, market information, and other relevant information, therefore, traders are exposed to multiple inputs at once, and must be effective at multitasking.

With specific regard to phone communications, multiple calls may be occurring simultaneously, and it is desirable to have the ability to move calls between handsets (e.g., moving an unexpectedly long call to a hands-free handset to ease neck strain), while at the same time keeping the trader clearly apprised of such changes.

BRIEF DESCRIPTION

The example embodiments described herein meet the above-identified needs by providing systems, methods, and computer program products for providing a call swap.

In one example embodiment, multiple simultaneous calls are controlled. At least one processor is used to display an interface including indicators corresponding to at least two audio presentation devices. Each interface includes call contextual controls which change according to the state of a call. A swap control swaps an active call between the audio presentation devices corresponding to the indicators.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings.

DETAILED DESCRIPTION

I. Overview

The present invention is directed to systems, methods and computer program products for swapping communication channels, which will now be described in more detail herein in terms of exemplary handsets and headsets coupled to an exemplary turret device. This is for convenience only and is not intended to limit the application of the present invention. In fact, after reading the following description, it is apparent to one skilled in the relevant art(s) how to implement the following invention into soft phones and Private Branch Exchange (PBX) phones. Moreover, the environment in which such systems, methods and computer program products are employed is not limited. The embodiments described herein also can be implemented in various environments including trading, security/law enforcement, public safety utilities, healthcare, and customer support (e.g., contact centers) environments.

II. Definitions

Some terms are defined below for easy reference. However, it should be understood that the defined terms are not rigidly restricted to their definitions. A term may be further defined by its use in other sections of this description.

"Device" means software, hardware or a combination thereof. A device may sometimes be referred to as an apparatus. Examples of a device include without limitation a laptop computer, a database, a server, a display, a computer mouse, and a hard disk.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for operating by a processor, such that the embodiments could be implemented as software, hardware, or a combination thereof. Non-transitory computer-readable media are discussed in more detail in a separate section below.

"System" means a device or multiple coupled devices. A device is defined above.

III. System

Figure 1:
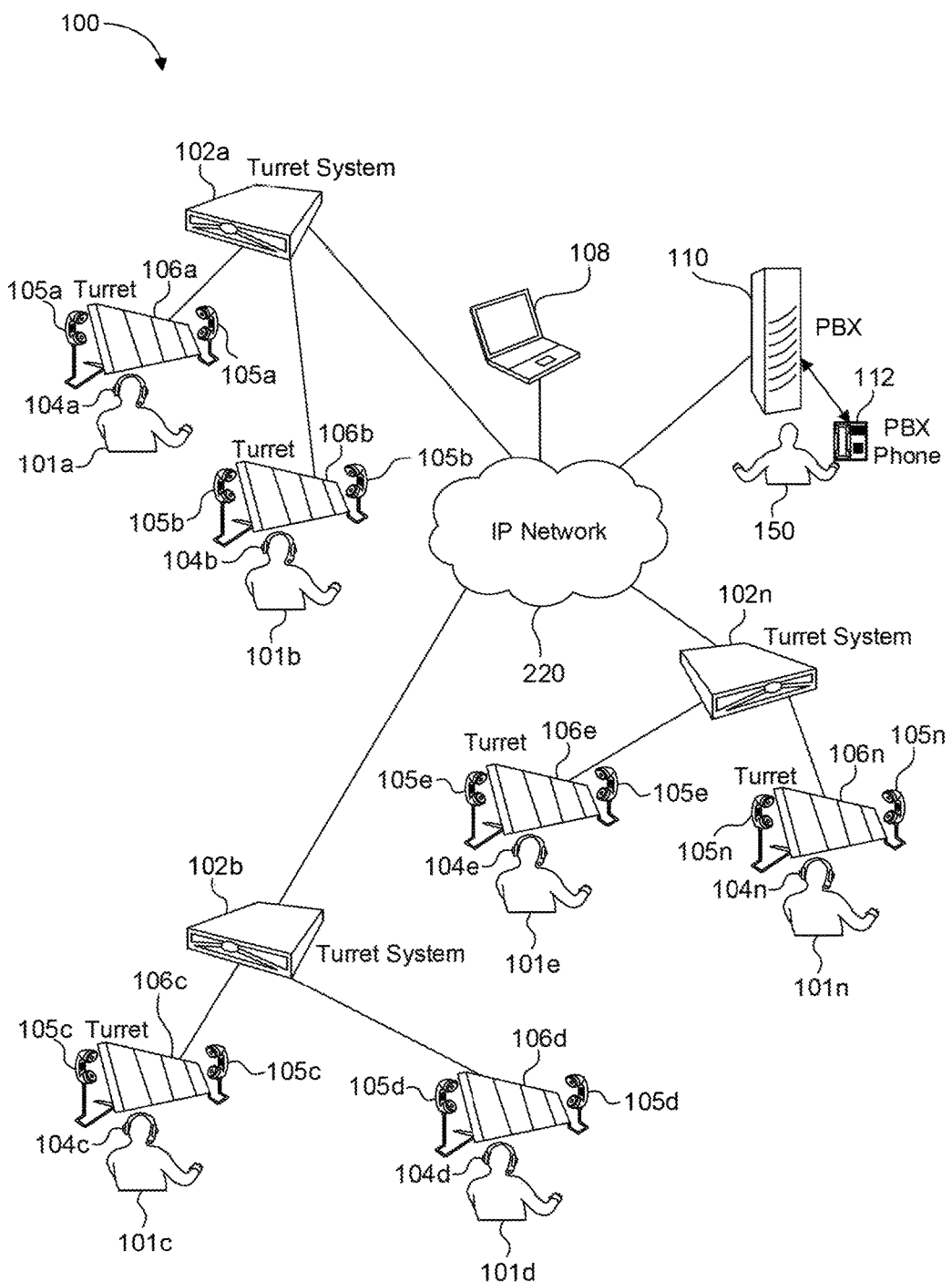
FIG. 1 is an illustrative view of an environment in which some embodiments of the invention may be implemented.

FIG. 1 depicts an example communication system 100 in accordance with an embodiment of the present invention. As shown in FIG. 1, communications system 100 includes turret systems 102a, 102b, . . . 102n communicatively coupled to turret devices 106a, 106b, . . . 106n, Private Branch Exchange (PBX) switch 110 communicatively coupled to a PBX phone 112, and an internet protocol (IP) network 114. Users 101a, 101b, 101c, . . . 101n and 150 are stationed at various locations in the network.

A turret device (or system) is a specialized key telephony switching system that allows a relatively small number of users to access a large number of external lines. It provides enhanced communication features such as hoot-n-holler, push-to-talk, intercom, video, and large-scale conferencing. A turret device (or simply "turret") is a component that enables a user to control multiple dedicated, always-on lines of communication that can be used to allow for simultaneous communications with multiple parties. Turret devices can have dual handsets, multichannel speaker modules, and several communication lines.

In particular, as shown in FIG. 1, each turret device 106 includes multiple handsets and provides a user interface which allows users 101 to access and use resources. Similarly users of softphone 108 (not shown) or PBX phone 112 (150) can access and use turret system resources available to them. In an example embodiment, a SIP line card (not shown) in turret device 106 operates as a SIP gateway to the switching fabric of the turret system 102. A turret system 102 can communicate with other turret systems, at least one PBX switch 110, or at least one remote computing device 108 over IP network 220.

A turret device 106 is the primary user device as it provides displays, accepts microphone input, outputs audio through speakers, and controls handsets, buttons and light emitting diodes (LEDs) for the features of communication system 100. A computing device 108 can also be programmed to implement these features, as can a PBX phone 112 that has been configured to share resources with turret systems 106.

In that regard, FIG. 1 depicts a first user 101a at turret 106a. Turret 106a includes a display which depicts, e.g., financial trading information flows and communications. The user can also communicate with other traders using audio. To that end, user 101a wears a telephonic headset 104a, and also has the option to communicate using a handset 105a. In a broad sense, headset 104a is essentially a specific type of handset.

Of course, it should be understood that several other variations of the number and identity (e.g., server/client/etc.) of devices might be included, and the simplified interaction shown in FIG. 1 is merely one example. Moreover, it should be understood that the number and types of handsets, headsets or other communication devices may be implemented in any number of ways, and that the arrangement shown in FIG. 1 is merely an example of such an arrangement.

In addition, the type of devices on network 220 may not be limited to those shown, and may include other devices, such as, for example, a personal media device, a portable media player, an iPod™, an iPad™, a laptop or desktop computer, a palmtop computer, a smart phone, a cell phone, a mobile phone, a network attached storage (NAS) device, and so on.

Information may be transmitted in real-time or pseudo-real-time over network 220 between devices. Moreover, information transmitted over network 220 may include various different types of multimedia data including, for example, live or recorded video or audio and/or transcription thereof from a variety of sources including personal calls, calls from a trading floor or conference calls, and video broadcasts, and multimedia feeds or social networking updates such as Twitter™, persistent chats or instant messages, and market statistics, among many others. Thus, it should be understood that the received data likely includes multiple information flows or transmissions from multiple information sources connected to network 220.

In the environment shown in FIG. 1, and in particular in a financial trading environment, it is common for users such as user 101a and user 150 to be required to perform significant multitasking. For example, multiple data streams may be displayed on turret 106a at the same time that multiple telephone calls are coming in at once on headset 104a and/or handset 105a.

With particular respect to telephone calls, it is desirable to move an active call from one handset or headset to another handset or headset, e.g., between headset 104a and handset 105a. For example, if a call initially comes in on handset 105a and lasts relatively longer than expected, it may be desirable to swap that call over to headset 104a, which is hands-free, thus leaving user 101a's hands free to take other actions, as well as avoiding neck strain caused by holding handset 105a to the ear for an extended period of time. Conventionally, it would be necessary to put one call on hold, pick up the other handset or headset, and then resume the call from hold, which is time-consuming and inconvenient for both parties.

Therefore, according to embodiments described herein, a single one-key activation (e.g., a single "soft" button on turret 106a) allows for quickly and easily swapping calls between devices such as headset 104a and handset 105a, as discussed more fully below.

IV. Device

Figure 2:
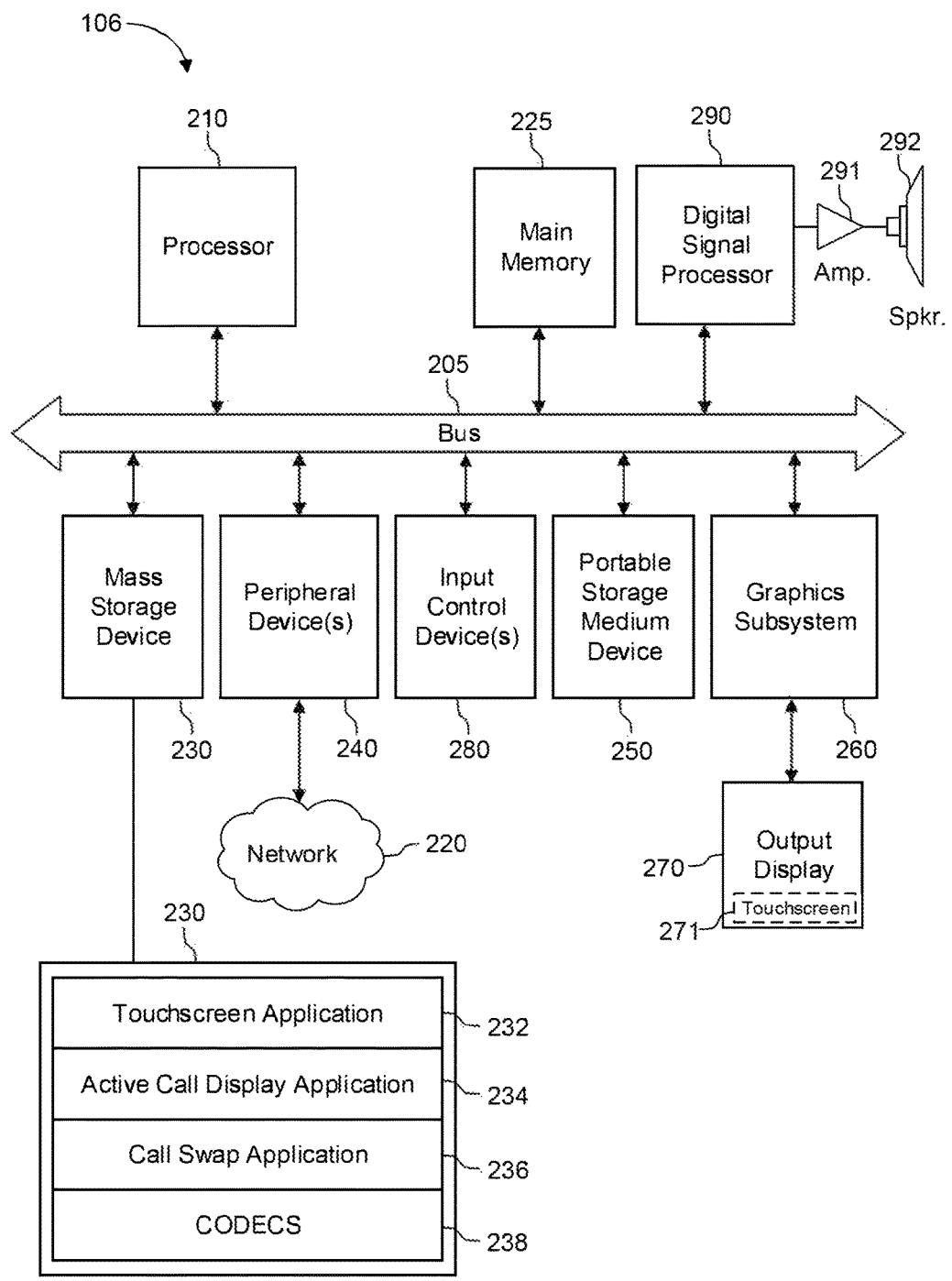
FIG. 2 is a block diagram of an example computer useful for implementing the present invention.

FIG. 2 is a block diagram of an example turret device 106 in accordance with some of the example embodiments described herein. Turret device 106 may include without limitation a processor 210, a main memory 225, and an interconnect bus 205. Processor 210 may include without limitation a single microprocessor, or may include a plurality of microprocessors for configuring the turret device 106 as a multi-processor system. The main memory 225 (which is a non-transitory memory) stores, among other things, instructions and/or data for execution by the processor 210. The main memory 225 may include banks of dynamic random access memory (DRAM), as well as cache memory.

Turret device 106 may further include a non-transitory mass storage device 230, peripheral device(s) 240, portable non-transitory storage medium device(s) 250, input control device(s) 280, a graphics subsystem 260, and/or an output display interface 270 having a touch screen interface 271. In this example, all of the components in turret device 106 in FIG. 2 are shown as being coupled via the bus 205. However, the turret device 106 is not so limited. Elements of the turret device 106 may be coupled via one or more other data transport means. For example, the processor 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a non-volatile storage device for storing data and/or instructions for use by the processor 210. The mass storage device 230 may be implemented, for example, with a magnetic disk drive or an optical disk drive. In a software embodiment, the mass storage device 230 is configured for loading contents of the mass storage device 230 into the main memory 225.

Mass storage device 230 additionally stores a touchscreen application 232, an active call display application 234, a call swap application 236 and CODECs 238. These applications are not limited to this particular software configuration. The software components may be combined into one application or divided into additional components. Touchscreen application 232 provides a mechanism for inputting information into turret device 106 through touchscreen interface 271 in accordance with the example aspects of the present invention. Touchscreen interface application 232, in conjunction with input control device 280, graphic subsystem 260 and output display 270, allows selection of a displayed icon or element by touching the screen in a location corresponding to the desired icon or element. It should be understood that the touchscreen interface 271 and solo interface application 232 of the turret device 106 are merely exemplary. Other types of interfaces and corresponding interface applications can be used and still be within the scope of the invention. Accordingly, in the following example embodiments the touchscreen interface 271 can be replaced with other forms of input interfaces such as physical buttons, voice recognition (e.g., voice recognition where an audio channel number or command is spoken), and the like.

Active call display application 234 is invoked for displaying status and audio configuration settings for audio communication channels in conjunction with mass storage device 230. The settings for each speaker channel, including its preset volume, can be stored in mass storage device 230. The configuration can be set prior to instantiation of any communication channels or afterwards. Call swap application 236 is for swapping an active call between the audio presentation devices, as described more fully below.

In one embodiment, touchscreen application 232, active call display 234, call swap application 236 and CODECs 238 are instructions, which when executed by processor 210 and/or DSP 290 of turret 106 FIGS. 1 and 2, cause turret device 106 to perform operations associated with displaying an interface including indicators corresponding to at least two audio presentation devices and call contextual controls which change according to the state of a call, and swapping an active call between the audio presentation devices corresponding to the indicators, as described more fully below.

The portable storage medium device 250 operates in conjunction with a nonvolatile portable storage medium, such as, for example, flash memory, to input and output data and code to and from turret device 106. In some embodiments, the software for storing information may be stored on a portable storage medium, and may be inputted into turret device 106 via the portable storage medium device 250. The peripheral device(s) 240 may include any type of computer support device, such as, for example, an input/output (I/O) interface configured to add additional functionality to turret device 106. For example, the peripheral device(s) 240 may include a network interface card for interfacing the turret device 106 with network 220.

Input control devices 280 can control the operation and various functions of turret device 106. Input control devices 280 can include any components, circuitry, or logic operative to drive the functionality of turret device 106. For example, input control device(s) 280 can include one or more processors acting under the control of an application in mass storage device 230. The input control device(s) 280 may include a keypad and/or a cursor control device (not shown). The keypad may be configured for inputting alphanumeric characters and/or other key or button information. The cursor control device may include, for example, a handheld controller or mouse, a trackball, a stylus, and/or cursor direction keys.

Display textual and graphical information may be displayed through the graphics subsystem 260 and the output display 270. The graphics subsystem 260 receives textual and graphical information, and processes the information for output to the output display 270. The output display 270 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. Output display 270 can also include a touchscreen interface 271. Example types of touchscreen interfaces include 5-Wire Resistive, Surface Capacitive, Projected Capacitive, SAW (Surface Acoustic Wave) and Infrared, and the like.

In one embodiment, turret device 106 also includes a digital signal processor (DSP) 290 for processing voice communications. DSP 290 may have its own bank of non-transitory synchronous dynamic random access memory (SDRAM). DSP 290 may also have its own writable non-transitory non-volatile serial read only memory (ROM) to store miscellaneous parameters. DSP 290, processor 210, and audio control application 236 are used, in part, to support call swap functions described in more detail below.

An aggregated interface of the data from multiple data sources can be presented to DSP 290 (e.g., via network 220 and peripheral device(s) 240 of FIG. 2) and output to a speaker 292 via an audio amplifier 291. For simplicity, audio amplifier 291 and/or speaker 292 are sometimes referred to herein simply as a turret output audio device. Audio signals can be input into DSP 290 for audio signal processing via microphone 293 as well. It should be understood that a turret device 106 may have other components not shown in FIG. 2.

Processor 210 causes incoming audio payloads from network 220 to be delivered to DSP 290 over bus 205. DSP 290, in turn, processes the audio payloads and uses CODECs 238 (encoder A/D, and decoder D/A) to code and decode and/or compress and decompress the digital data streams of audio in the payloads. Outgoing voice traffic originates from a microphone (e.g., microphone 293 of FIG. 2) and is formatted by DSP 290 and forwarded over bus 205 to processor 210 for transmission over the network 220. CODECs 238 interfaces to all of the transducer elements (e.g., handset(s) 105 of FIG. 1, speaker(s) 292, speaker modules, microphone(s) 293, and the like).

V. Process

Figure 3:
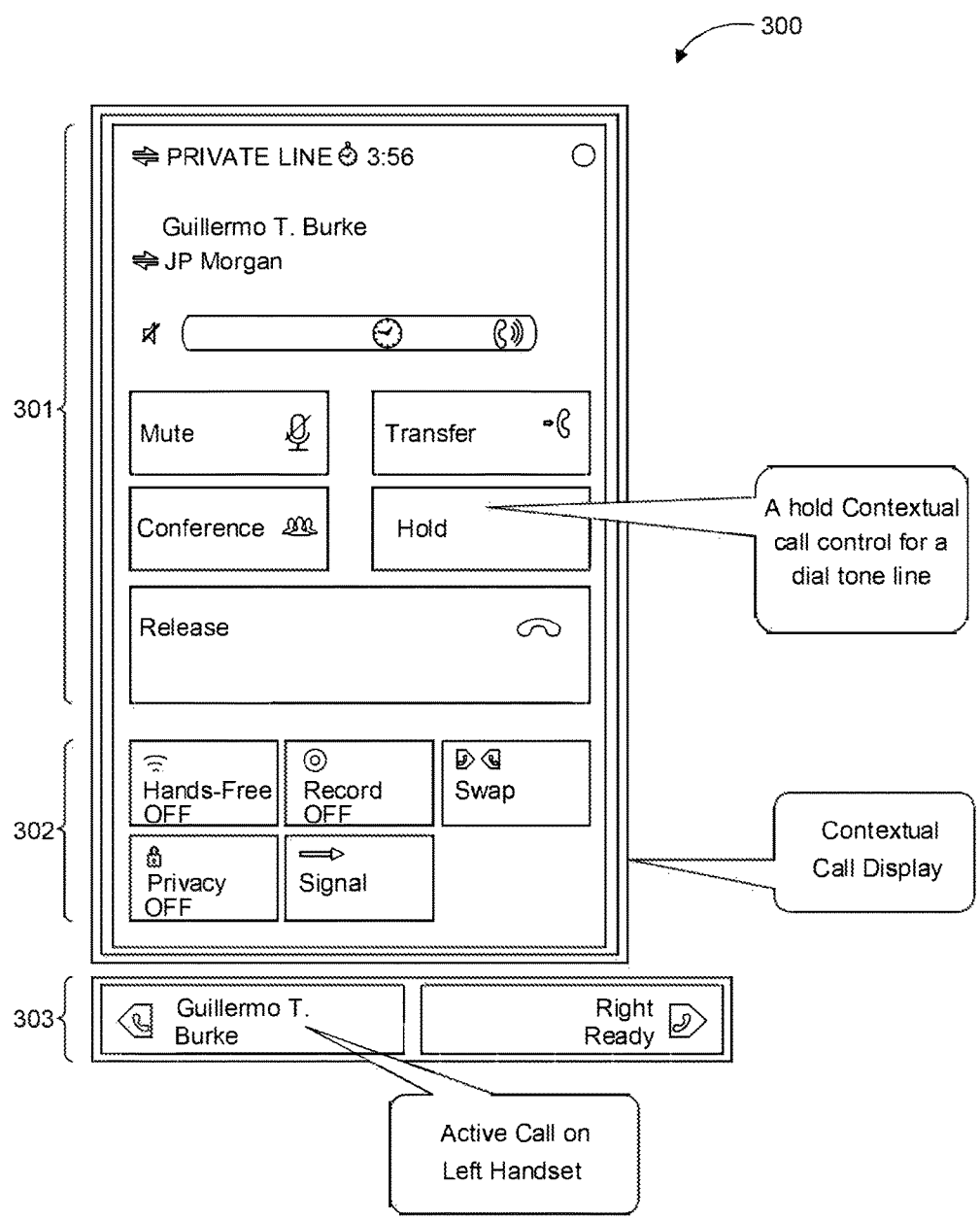
FIG. 3 is a view for explaining a user interface in connection with a call swap in accordance with an example embodiment of the invention.

FIG. 3 is a view for explaining a user interface in connection with a call swap in accordance with an example embodiment of the invention.

In one example embodiment, multiple simultaneous calls are controlled. At least one processor is used to display an interface including indicators corresponding to at least two audio presentation devices. Each interface includes call contextual controls which change according to the state of a call. A swap control swaps an active call between the audio presentation devices corresponding to the indicators.

In particular, FIG. 3 depicts a user interface 300, which may be displayed on, e.g., turret device 106, but which might also be displayed on a smaller device such as a smart phone.

As shown in FIG. 3, user interface 300 includes a call control area 301, a contextual call display 302, and an active call indicator 303.

Call control area 301 includes identifying information about the call and/or caller, along with controls for the call. For example, as shown in FIG. 3, call control area 301 identifies the caller as "Guillermo T. Burke" from JP Morgan, and includes call controls such as, for example, a volume slider control, a mute button, a transfer button, a conference call button, a hold button and a "release" button for ending the call.

Contextual call display 302 includes additional indicators and controls pertaining to the context of the call, including, for example, an indicator whether a hands-free device such as headset 104a is receiving the call (here, not currently, as indicated by OFF), a record button for recording the content of the call, a call swap button for swapping the calls between devices as discussed more fully below, a privacy button for adjusting privacy settings pertaining to the call, and a signal button for adjusting settings pertaining to the call signal.

Each call on each handset is represented by the contextual call display 302. The contextual call display 302 provides the call contextual controls, which control attributes of an active call. These call contextual controls change according to, e.g., the state (idle, active, or in transition) and type of a Call (Dial Tone, Intercom, or OpenConnexion). The most common contextual call control is the volume control. If contextual call controls are outside the context of a call, they are either disabled or not presented to the user.

"Call Swap" is the contextual call control that swaps the call(s) between two handsets on a communication device that can place and receive calls to and from far-end parties. In one example, a call swap control in contextual call display 302 swaps calls between the two handsets: a "left handset" and a "right handset". When an active call is on the left handset and the right handset is idle, pressing the swap button brings the call to the right handset and renders the left handset side idle, and vice versa. When there is an active call on both the left handset and the right handset, pressing the swap button switches the handsets, such that the left handset call moves to the right handset and vice versa. Each of these processes will be described in more detail below.

Active call indicator 303 shows the state of headsets and/or handsets, and in particular whether the headset or handset currently has an active call. Thus, as shown in FIG. 3, the left side of the display is highlighted, to indicate that there is an active call on the left handset. In one example, the indicator for the device with the active call may be displayed in a different color or in a different brightness. In addition, as will be discussed more fully herein, selecting the call swap control in contextual call display 302 causes the active call to be swapped between the two devices. Thus, for example, if the call swap button is selected, the display in active call indicator 303 would be changed to highlight the right side, rather than the left, although the locations of the device displays would remain the same.

Thus, in one aspect, the location of the call contextual controls remains in the same location in the interface after an active call is swapped, but the call contextual controls are modified to show which audio presentation device has the active call. In another aspect, the swap control is a selectable display element displayed as part of the interface.

In one example, a single, active call on either the left handset or the right handset can be heard on a hands-free module (e.g., a speaker for listening and a microphone for speaking). When an active call on a left handset uses the hands-free module and the right handset is idle, pressing the swap call button swaps the context from the left handset contextual display to the right handset display and the call continues on the hands-free module.

In another example, when the left handset uses the hands-free module for an active call and there is also an active call on the right handset, pressing the swap call button switches the left handset call to the right handset contextual call display and preserves the hands-free module, and the right handset active call is displayed on the left handset contextual display.

Figure 4:
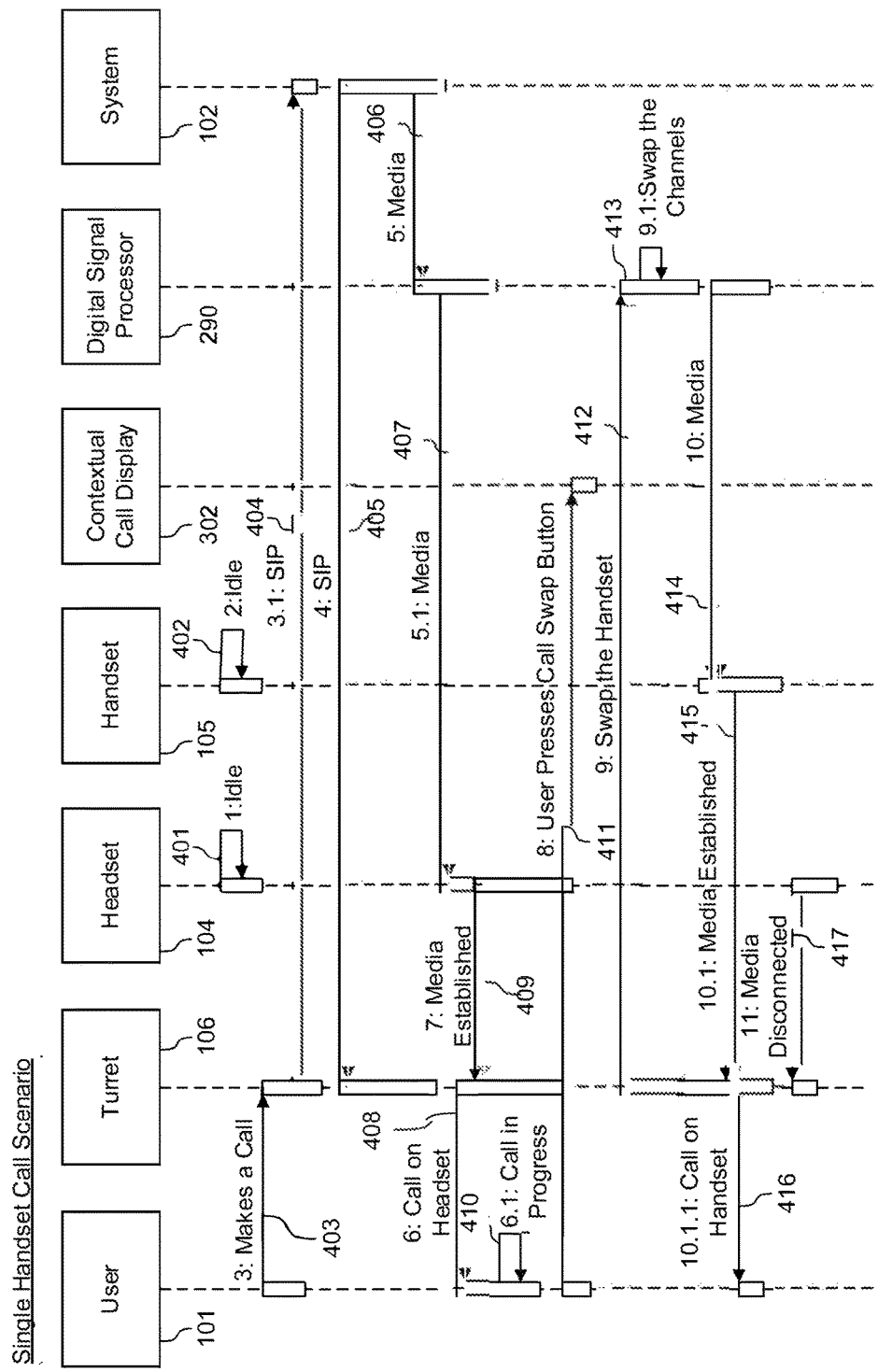
FIG. 4 is a sequence diagram for controlling a call swap in accordance with an example embodiment of the invention.

FIG. 4 is a sequence diagram for controlling a call swap in accordance with an example embodiment of the invention.

In particular, FIG. 4 depicts a sequence diagram for performing a call swap in a "single handset call" scenario— that is, a situation in which only one of the two handsets currently has an active call. Thus, for example, a single call may be swapped from handset 105 to headset 104. In that regard, for purposes of simplicity, FIG. 4 and FIG. 5 refer to a generic handset 105 and headset 104, user 101 and the like, rather than a specific instance thereof (e.g., handset 105a, user 101a).

In contrast, a "two handset call" refers to a situation in which there are two active calls (on both handsets) which are swapped between both headsets and/or handsets, and will be described more fully below with respect to FIG. 5.

As shown in FIG. 4, the entities involved are user 101, turret 106 (e.g., a turret user interface displayed on display 103), handset 105 and headset 104a (corresponding to first and second handsets), contextual call display 302 including the call swap button, digital signal processor 290, and system 102.

In step 401, handset 105 sits idle.

In step 402, headset 104 also sits idle.

In step 403, a call is made (e.g., by user 101) to another party using the interface on turret 106. In response, in step 404, turret 106 transmits a Session Initiation Protocol (SIP) packet request to system 102, in order to initiate the call. The SIP protocol defines the messages that are sent between endpoints, which govern establishment, termination and other essential elements of a call.

In step 405, system 102 begins gathering media selected for that call, and transmits an SIP response to turret 106. The response may include, for example, a message body including the media to be displayed, as well as protocols used to establish the call and display. For example, the Remote Desktop Protocol (RDP) is a proprietary protocol which provides a graphical interface to connect to another computer over a network connection. In this context, the RDP may be used to establish, e.g., what media are transmitted from system 102 for the call. For example, once the call is initially established, system 102 may select media to display and send a control signal to affected entities. In that regard, "media" here may also include the associated voice communication.

Thus, in step 406, system 102 transmits appropriate media to digital signal processor 290, which processes the data as needed before forwarding it to handset 105 in step 407. In step 408, the active call begins on handset 105, and associated display is provided from turret 106 to user 101.

In step 409, handset 105 confirms to turret 106 that the associated media has been established, and begins to display the media along with providing data from the now-active call on handset 105 to the user 101.

In step 410, the call remains in progress.

In step 411, the call swap button is selected (e.g., pressed by user 101) on contextual call display 302. In response, the system maintains the channel (e.g., keeps it on the line but not on hold) and begins sending media to the other handset (here, headset 104).

In step 412, turret 106 sends a request to digital signal processor 290 to swap the handsets, and in step 413, digital signal processor 290 swaps the media channel from a channel corresponding to handset 105 to a channel corresponding to headset 104, and in step 414, begins sending the media to headset 104.

In that regard, according to the embodiment, maintaining a call also includes maintaining associated call data. Thus, for example, a "mute" on a first call would carry across to a new handset. In another example, call audio volume data is saved so that all of the call variables do not need to be re-set (e.g., by user 101) after the swap. Other examples of associated variables include, e.g., privacy settings and preferences for call identification information to be displayed.

Thus, in one aspect, the volume and status of the swapped active call are maintained as it is passed to a new audio presentation device. In another aspect, the status information includes privacy settings. In still another aspect, the volume and status are maintained by saving variables when the active call is swapped, and loading the variables for the call on the new audio presentation device.

In step 415, headset 104 confirms to turret 106 that the media has been established. In step 416, turret 106 changes display (e.g., using active call indicator 303) to indicate that the active call is now on the second handset, which is headset 104. In step 417, handset 105 confirms to turret 106 that the media being sent to it has been disconnected, as expected.

Figure 5:
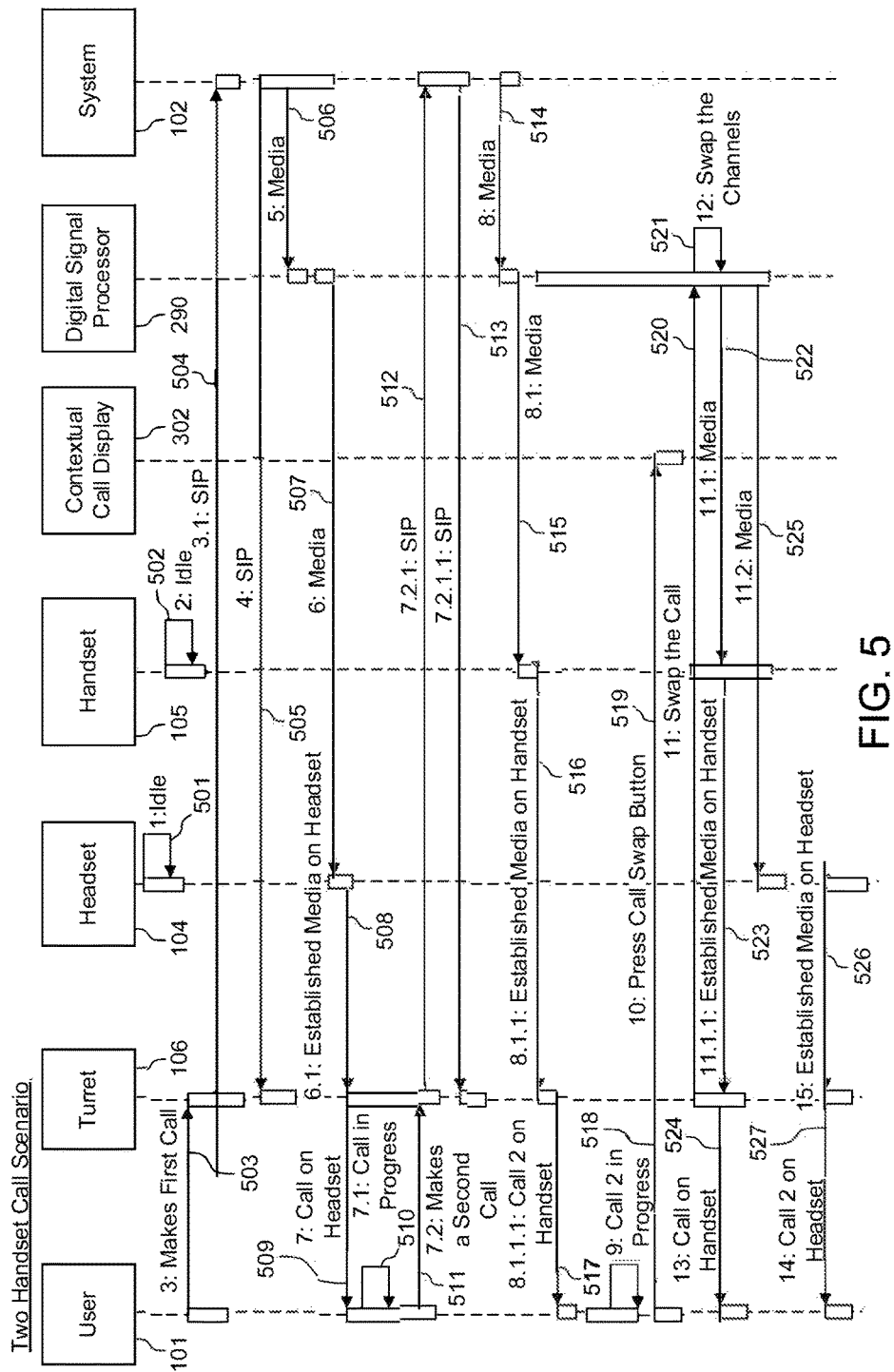
FIG. 5 is a sequence diagram for controlling a call swap in accordance with an example embodiment of the invention.

FIG. 5 is a sequence diagram for controlling a call swap in accordance with an example embodiment of the invention.

Specifically, as mentioned above, FIG. 5 depicts a "two handset call" scenario, which refers to a situation in which there are two active calls (on both handsets) which are swapped between both headsets and/or handsets. In one sense, the two-call scenario is simpler, as both active calls are already established.

As shown in FIG. 5, the entities involved are again user 101, turret 106 (e.g., a turret user interface displayed on display 103), handset 105 and headset 104 (corresponding to first and second handsets), contextual call display 302 including the call swap button, digital signal processor 290, and system 102.

In step 501, handset 105 sits idle.

In step 502, headset 104 also sits idle.

In step 503, a first call is made (e.g., by user 101) to another party, using the user interface on turret 106. In response, in step 504, turret 106 transmits a Session Initiation Protocol (SIP) packet request to system 102, in order to initiate the call. The SIP protocol defines the messages that are sent between endpoints, which govern establishment, termination and other essential elements of a call.

In step 505, system 102 begins gathering media selected for that call, and, transmits an SIP response to turret 106. The response may include, for example, a message body including the media to be displayed, as well as protocols used to establish the call and display. For example, the Remote Desktop Protocol (RDP) is a proprietary protocol which provides a user with a graphical interface to connect to another computer over a network connection. In this context, the RDP may be used to establish, e.g., what media are transmitted from system 102 for the call. For example, once the call is initially established, system 102 may select media to display and send a control signal to affected entities. In that regard, "media" here may also include the associated voice communication.

Thus, in step 506, system 102 transmits appropriate media to digital signal processor 290, which processes the data as needed before forwarding it to handset 105 in step 507. In step 508, handset 105 confirms to turret 106 that the associated media has been established.

In step 509, the active call begins on handset 105, and associated display is provided from turret 106 to user 101. Thus, turret 106 begins to display the media along with providing data from the now-active call on handset 105 to the user 101.

In step 510, the first call remains in progress.

In step 511, a second call is made via turret 106. Initially, this call will be established on the only currently available handset, which is headset 104.

Accordingly, and similarly to the process discussed above, in response, in step 512, turret 106 transmits a Session Initiation Protocol (SIP) packet request to system 102, in order to initiate the second call.

In step 513, system 102 begins gathering media selected for the second call, and transmits an SIP response to turret 106. The response may include, for example, a message body including the media to be displayed, as well as protocols used to establish the call and display. Again, "media" here may also include the associated voice communication.

Thus, in step 514, system 102 transmits appropriate media to digital signal processor 290, which processes the data as needed before forwarding it to headset 104 in step 515. In step 516, headset 104 confirms to turret 106 that the associated media has been established.

In step 517, the active second call begins on headset 104, and the associated display is provided from turret 106 to user 101. Thus, turret 106 begins to display the media along with providing data from the now-active second call on headset 104 to the user 101.

Thus, as of step 518, there are two currently active calls, a first call on handset 105, and a second call on headset 104.

In step 519, the call swap button is selected (e.g., by user 101) on contextual call display 302.

In step 520, turret 106 instructs digital signal processor 290 to swap the calls. In that regard, in this context, digital signal processor 290 swaps In response, in step 521 the digital signal processor 290 maintains both channels (e.g., keeps each channel on the line but not on hold) and begins sending media to the "other" respective handset.

Therefore, in step 522, digital signal processor 290 begins sending media from the first call to headset 104, and in step 523 headset 104 confirms to turret 106 that the media has been established on headset 104.

Thus, as of step 524, the original first call has now moved from handset 105 to headset 104. Additionally, in step 525, the media for the second call is now transmitted to handset 105, and in step 526, handset 105 confirms to turret 106 that the media has been established on handset 105. Thus, as of step 527, the original second call has been moved from headset 104 to handset 105.

As such, in a case that a first audio presentation device and a second audio presentation device both currently have active calls, the swap control swaps the respective active calls between the two audio presentation devices.

As can be appreciated in view of the foregoing description, even with the vast volume of trades taking place in today's financial markets, and the limitless trader communications, market information, and other relevant information, a trading desk of financial traders may be more effectively and efficiently managed, in accordance with example embodiments of the invention.

VI. Non-Transitory Computer-Readable Medium Implementation

The example embodiments described above such as, for example, the systems and procedures depicted in or discussed in connection with FIGS. 1 to 5, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such non-transitory computer-readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for controlling two or more calls, comprising the steps of:
using at least one processor to perform:
displaying an interface including indicators corresponding to at least first and second physically independent audio presentation devices, the indicators including, for each of the first and second audio presentation devices, an active call indicator, wherein the interface includes call contextual controls which change according to a state of a call; and
swapping, by selecting a swap control displayed on the interface, a first active call from the first audio presentation device to the second audio presentation device and a second active call from the second audio presentation device to the first audio presentation device.

2. The method according to claim 1, wherein, in response to the selecting, the active call indicators of the first and second audio presentation devices remain on.

3. The method according to claim 1,
wherein the interface includes a first contextual display corresponding to the first audio presentation device and a second contextual display corresponding to the second audio presentation device;
wherein the call contextual controls include first contextual controls corresponding to the first active call and displayed on the first contextual display and second contextual controls corresponding to the second active call and displayed on the second contextual display; and
wherein the selecting causes the first contextual controls to switch from the first contextual display to the second contextual display and the second contextual controls to switch from the second contextual display to the first contextual display.

4. The method according to claim 1, wherein a volume and status information of each of the first active call and the second active call are maintained as the first active call is swapped to the second audio presentation device and the second active call is swapped to the first audio presentation device.

5. The method according to claim 4, wherein the volume and the status information of each of the first active call and the second active call are maintained by:
saving variables for the first active call and the second active call when the first active call is swapped to the second audio presentation device and the second active call is swapped to the first audio presentation device;
loading the variables for the first active call on the second audio presentation device; and
loading the variables for the second active call on the first audio presentation device.

6. The method according to claim 1, wherein the swap control is a selectable display element displayed as part of the interface.

7. The method according to claim 1, wherein one of the first and second audio presentation devices is a headset and the other of the first and second audio presentations devices is a handset.

8. The method according to claim 1, wherein both the first and second audio presentation devices are handsets.

9. A system for controlling two or more calls, comprising:
at least one processor, wherein the processor is configured to:
display an interface including indicators corresponding to at least first and second physically independent audio presentation devices, the indicators including, for each of the first and second audio presentation devices, an active call indicator, wherein the interface includes call contextual controls which change according to a state of a call; and
swap, in response to selecting a swap control displayed on the interface, a first active call from the first audio presentation device to the second audio presentation device and a second active call from the second audio presentation device to the first audio presentation device.

10. The system according to claim 9, wherein, in response to the selecting, the active call indicators of the first and second audio presentation devices remain on.

11. The system according to claim 9,
wherein the interface includes a first contextual display corresponding to the first audio presentation device and a second contextual display corresponding to the second audio presentation device;
wherein the call contextual controls include first contextual controls corresponding to the first active call and displayed on the first contextual display and second contextual controls corresponding to the second active call and displayed on the second contextual display; and
wherein the selecting causes the first contextual controls to switch from the first contextual display to the second contextual display and the second contextual controls to switch from the second contextual display to the first contextual display.

12. The system according to claim 9, wherein a volume and status information of each of the first active call and the second active call are maintained as the first active call is swapped to the second audio presentation device and the second active call is swapped to the first audio presentation device.

13. The system according to claim 12, wherein the volume and the status information of each of the first active call and the second active call are maintained by:
saving variables for the first active call and the second active call when the first active call is swapped to the second audio presentation device and the second active call is swapped to the first audio presentation device;
loading the variables for the first active call on the second audio presentation device; and
loading the variables for the second active call on the first audio presentation device.

14. The system according to claim 9, wherein the swap control is a selectable display element displayed as part of the interface.

15. The system according to claim 9, wherein the system includes the first and second audio presentation devices.

16. The system according to claim 15, wherein one of the first and second audio presentation devices is a headset and the other of the first and second audio presentations devices is a handset.

17. The system according to claim 15, wherein both the first and second audio presentation devices are handsets.

18. A non-transitory computer-readable medium having stored thereon sequences of instructions, the sequences of instructions including instructions, which, when executed by a computer system, cause the computer system to:
display an interface including indicators corresponding to at least first and second physically independent audio presentation devices, the indicators including, for each of the first and second audio presentation devices, an active call indicator, wherein the interface includes call contextual controls which change according to a state of a call; and
swap, in response to selecting a swap control displayed on the interface, a first active call from the first audio presentation device to the second audio presentation device and a second active call from the second audio presentation device to the first audio presentation device.

19. The computer-readable medium according to claim 18,
wherein the interface includes a first contextual display corresponding to the first audio presentation device and a second contextual display corresponding to the second audio presentation device;
wherein the call contextual controls include first contextual controls corresponding to the first active call and displayed on the first contextual display and second contextual controls corresponding to the second active call and displayed on the second contextual display; and
wherein the selecting causes the first contextual controls to switch from the first contextual display to the second contextual display and the second contextual controls to switch from the second contextual display to the first contextual display.

20. The computer-readable medium according to claim 18, wherein a volume and status information of each of the first active call and the second active call are maintained as the first active call is swapped to the second audio presentation device and the second active call is swapped to the first audio presentation device.

21. The computer-readable medium according to claim 20, wherein the volume and the status information of each of the first active call and the second active call are maintained by:
saving variables for the first active call and the second active call when the first active call is swapped to the second audio presentation device and the second active call is swapped to the first audio presentation device;
loading the variables for the first active call on the second audio presentation device; and loading the variables for the second active call on the first audio presentation device.

\* \* \* \* \*